United States Patent
Christo et al.

(10) Patent No.: US 10,235,491 B2
(45) Date of Patent: Mar. 19, 2019

(54) DYNAMIC ROUTE KEEP-OUT IN PRINTED CIRCUIT BOARD DESIGN

(71) Applicant: International Business Machines Corporation, Armonk, NY (US)

(72) Inventors: Michael A. Christo, Round Rock, TX (US); David L. Green, Austin, TX (US); Julio A. Maldonado, Austin, TX (US); Diana D. Zurovetz, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/597,496

(22) Filed: May 17, 2017

(65) Prior Publication Data

US 2018/0336306 A1 Nov. 22, 2018

(51) Int. Cl.
*G06F 17/50* (2006.01)

(52) U.S. Cl.
CPC ...... *G06F 17/5077* (2013.01); *G06F 17/5081* (2013.01); *G06F 17/505* (2013.01); *G06F 17/5022* (2013.01); *G06F 17/5027* (2013.01); *G06F 17/5036* (2013.01); *G06F 17/5072* (2013.01)

(58) Field of Classification Search
CPC ............. G06F 17/5077; G06F 17/5081; G06F 17/5036; G06F 17/5022; G06F 17/5027; G06F 17/505; G06F 17/5072
USPC ....... 716/126, 137, 104, 106, 108, 116, 128, 716/131
See application file for complete search history.

(56) References Cited

U.S. PATENT DOCUMENTS

| 6,861,753 | B1 * | 3/2005 | Chen ............... G06F 17/5077 257/758 |
| 7,441,220 | B2 * | 10/2008 | Hetzel ............. G06F 17/5077 716/130 |
| 7,849,427 | B2 | 12/2010 | Christo et al. |
| 8,250,514 | B1 | 8/2012 | Wadland et al. |
| 9,213,793 | B1 * | 12/2015 | Salowe ............ G06F 17/5077 |
| 2001/0038612 | A1 | 11/2001 | Vaughn et al. |
| 2008/0250377 | A1 | 10/2008 | Bird et al. |
| 2009/0024977 | A1 * | 1/2009 | Hetzel ............. G06F 17/5077 716/130 |

(Continued)

FOREIGN PATENT DOCUMENTS

| EP | 2881714 | 6/2015 |
| WO | 2009108624 | 9/2009 |
| WO | 2012173683 | 12/2012 |

OTHER PUBLICATIONS

Berg et al., FDTD and FEM/MOM Modeling of EMI Resulting from a Trace Near a PCB Edge, Electromagnetic Compatibility, 2000. IEEE International Symposium,vol. 1, pp. 135-140, 2000.

*Primary Examiner* — Stacy Whitmore
(74) *Attorney, Agent, or Firm* — Lieberman & Brandsdorfer, LLC

(57) ABSTRACT

Dynamic electronic printed circuit board (PCB) design is provided. A voltage split having a first geometric shape in a first layer of the PCB is identified. Based on the voltage split, a boundary having a second geometric shape is created in an adjacently positioned layer of the PCB with respect to the first layer. A net having at least two pins is dynamically routed in the PCB. An intersection of the net with the first boundary is identified and dynamically resolved.

20 Claims, 10 Drawing Sheets

(56) References Cited

U.S. PATENT DOCUMENTS

| | | | |
|---|---|---|---|
| 2009/0193383 A1 | 7/2009 | Christo et al. | |
| 2012/0117530 A1* | 5/2012 | Green | G06F 17/5045 716/139 |
| 2014/0084957 A1* | 3/2014 | Morishita | G06F 17/5081 324/763.01 |
| 2014/0289695 A1* | 9/2014 | Yoshida | G06F 17/5081 716/136 |
| 2016/0140279 A1* | 5/2016 | Zhu | G06F 17/5072 716/119 |

* cited by examiner

DYNAMIC ROUTE KEEP-OUT IN PRINTED CIRCUIT BOARD DESIGN

BACKGROUND

The present embodiments relate to printed circuit board design. More specifically, the embodiments relate to dynamic resolution of a route exception based on a generated boundary corresponding to a voltage split.

Various electronic products are embedded with a printed circuit board (PCB). The PCB mechanically and electrically supports component(s) which provide functionality to an electronic product. The PCB may include multiple layers supporting a desired functionality. The electrical support includes a conductive track, a pad, a vertical interconnect access (VIA) and/or other features which interconnect the component(s). In order to properly design the PCB, multiple factors have to be considered. The factors may be functionality of an element, configuration of the element, functionality of the PCB, configuration of the PCB, etc.

Computer aided design (CAD) software may be utilized by a PCB designer to support a design of the PCB which conforms to the multiple factors. The CAD software represents different component(s) as digital object(s) having a physical shape and corresponding connection requirements. The design process starts with defining PCB parameters such as functionality, component(s) to be supported, quantity of layers, and/or size. The PCB design process positions the component(s) on the PCB utilizing the CAD software. A dataset comprising one or more networks of connections (e.g., a net) is created from the defined functionality and/or component(s). Each net describes connectivity of pins in the PCB corresponding to connections on the component(s) assigned to the net. A single net provides similar electrical support to all pins within the net. During design of the PCB, each net is provided with interconnections connecting all pins of the net by a wire(s) (e.g., conductive trace) and/or a VIA while avoiding overlap with a wire and/or a VIA of a second net. Each net has to be designed in accordance with the factors in order to assure the PCB will operate properly.

SUMMARY

A system, computer program product, and method are provided for dynamic resolution of a route exception based on a generated boundary corresponding to a voltage split.

In one aspect, a system for dynamic electronic printed circuit board (PCB) design is provided with a processor in communication with memory and a design module. The design module identifies a voltage split having a first geometric shape in a first layer of a PCB. Based on the voltage split, the design module dynamically creates a first boundary having a second geometric shape in one or more layers of the PCB adjacently positioned to the first layer. The design module dynamically routes a net having at least two pins in the PCB. The routing includes determining a first route for one or more wires to connect the at least two pins. The design module identifies a route exception including a determination that the first route intersects the first boundary in at least one of the adjacently positioned layers. The design module dynamically resolves the route exception.

In another aspect, a computer program product is provided for dynamic electronic PCB design. The computer program product includes a computer readable storage device with embodied program code that is configured to be executed by a processor. Program code identifies a voltage split having a first geometric shape in a first layer of a PCB. Based on the voltage split, program code dynamically creates a first boundary having a second geometric shape in one or more layers of the PCB adjacently positioned to the first layer. Program code dynamically routes a net having at least two pins in the PCB. The routing includes determining a first route for one or more wires to connect the at least two pins. Program code identifies a route exception including a determination that the first route intersects the first boundary in at least one of the adjacently positioned layers. Program code dynamically resolves the route exception.

In yet another aspect, a method is provided for dynamic electronic PCB design. A voltage split having a first geometric shape in a first layer of a PCB is identified. Based on the voltage split, a first boundary having a second geometric shape is dynamically created in one or more layers of the PCB adjacently positioned to the first layer. A net having at least two pins is dynamically routed in the PCB. The routing includes determining a first route for one or more wires to connect the at least two pins. A route exception is identified including a determination that the first route intersects the first boundary in at least one of the adjacently positioned layers. The route exception is dynamically resolved.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
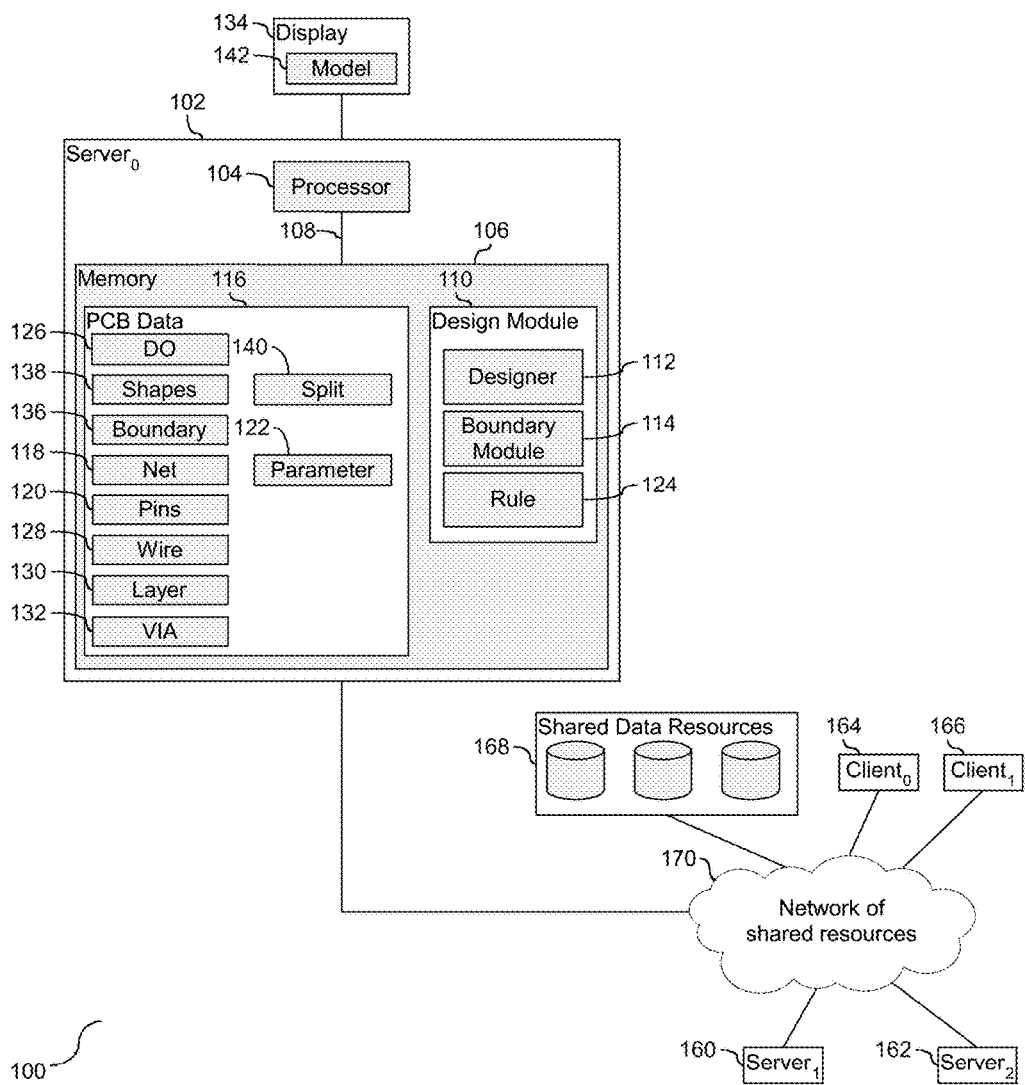
FIG. 1 depicts a block diagram illustrating a computer system for voltage split boundary creation.

It will be readily understood that the components of the present embodiments, as generally described and illustrated in the Figures herein, may be arranged and designed in a wide variety of different configurations. Thus, the following detailed description of the embodiments of the apparatus, system, and method of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment of the present embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

A printed circuit board (PCB) may comprise a single layer or multiple layers to electrically support one or more components. Similarly, the electrical support may span a single layer or multiple layers and includes a conductive track, pad, vertical interconnect access (VIA), and/or other features which interconnect the component(s). During design of the PCB, each layer may be provided with different functionality, such as different wires, VIAs, voltage shapes, etc. Only considering the features of a single layer at a time may lead to degradation in performance of the PCB. Accordingly, performance of the PCB is enhanced by taking into consideration multiple characteristics and associated functionality during the PCB design process.

During design of the PCB, typically a single layer of the PCB model is only visible at a time. However, electrical interference can be introduced into the functionality of a net on a first layer by a feature positioned in a layer adjacent to the first layer and thereby absent from the current view. For example, a net with a high criticality (e.g., a high speed signal net) that is positioned in a layer of the PCB adjacent to a layer containing a voltage split may experience negative impact(s) on signal quality. The criticality of the net relates to the importance of the electrical signal to be carried through the net and/or the susceptibility of the net to signal degradation. A voltage split is a space on a layer of the PCB that is positioned between two or more voltage shapes wherein at least two of the voltage shapes have a different voltage. In one embodiment, the voltage split is a physical part of the layer of the hardware PCB assembly created from the PCB model. The voltage split may be passively created by the generation of the voltage shapes and can cause degradation in signal integrity, electromagnetic immunity, and system quality of the net. Detecting a net with a high criticality crossing a voltage split positioned on an adjacent layer of the printed circuit board (PCB) late in the development process can cause extensive re-design of the PCB and/or signal quality issues.

A system, method, and computer program product are disclosed and described herein for dynamic resolution of a route exception based on a generated boundary (e.g., keep-out) corresponding to a voltage split. In order to limit signal degradation, a voltage split having a first geometric shape in a first layer of the PCB is identified. Based on the voltage split, a boundary having a second geometric shape is created in an adjacently positioned layer of the PCB with respect to the first layer. The creation of the boundary provides an object which prevents and/or limits a wire of a net being routed over a voltage split in an adjacent layer. In one embodiment, the boundary is a visual indication of the voltage split in the adjacent layer. A net having at least two pins is dynamically routed in the PCB. An intersection of the net with the first boundary is identified as a route exception. The route exception is dynamically resolved, in real-time, by changing the route, changing the geometric shape of the voltage shape, and/or creating a break in the route. The changed route may include, but is not limited to, a route within the same layer of the PCB as the boundary and/or creation of a VIA to utilize a second layer of the PCB to bypass the boundary.

Referring to FIG. 1, a block diagram (100) is provided illustrating a computer system for voltage split boundary creation. The system is shown with multiple servers, client machines, and shared resources in communication across a network. System tools for generating a boundary (e.g., a keep-out) and resolving a route exception as shown are embedded in server$_0$ (102), although in one embodiment the system tools may be provided on another machine in the network. Server$_0$ (102) is shown configured with a processor (104) in communication with a memory (106) across a bus (108). In one embodiment, system tools are accessible to other devices through a network connection. For example, server$_0$ (102) is also shown in communication with a network of shared resources (170) across a network connection to access shared resources, including, but not limited to, shared data resources (168), client machines, client$_0$ (164) and client$_1$ (166), and other servers, server$_1$ (160) and server$_2$ (162). The quantity of client machines, servers, and data resources shown and described herein are for illustrative purposes and should not be considered limiting.

PCB data (116) is embedded within memory (106) and is a representation of a hardware PCB assembly including a representation of different components and/or functionality of the hardware PCB assembly. PCB data (116) includes at least one layer (130). In one embodiment, each layer (130) is a representation of a layer of the hardware PCB assembly. Each layer (130) is associated with a physical position and an orientation with respect to the other PCB layers (130). In one embodiment, the layers (130) are stacked to form a single hardware PCB assembly. In one embodiment, processor (104) utilizes PCB data (116) to render and/or display a PCB model (142) on a visual display (134) in communication with server$_0$(102), with the model being a representation of the hardware PCB assembly. The PCB model (142) may be a two-dimensional or a three-dimensional model of the hardware PCB assembly. PCB data (116) includes one or more digital objects, such as digital object (DO) (126), representing one or more component(s) that will be included in the hardware PCB assembly. Each digital object (126) has a shape and corresponding electrical connection requirements. The electrical connection requirements include which electrical voltage(s) and/or signal(s) need to be supplied to the digital object (126) by way of wire(s) (128), such that the hardware PCB assembly built from the PCB data (116) will function properly. Accordingly, PCB data (116) represents the functionality of the hardware PCB assembly in a virtual environment.

Pins (120) are a representation of an electrical connection (e.g., surface mount pad, VIA, terminal, solder connection, etc.) within the hardware PCB assembly. Each pin (120) may correspond to a connection to, but is not limited to, the digital object (126), a vertical interconnect access (VIA) (132), a voltage shape (138), and other electrical connections. Each pin (120) is associated with a corresponding electrical source and/or signal. Similarly, each pin (120) is associated with a respective net (118) and in one embodiment linked to the respective net (118). Each net (118) describes the connectivity of at least two pins (120) associated with the respective net (118) (e.g., network of connections). During design of the PCB, all pins (120) within a respective net (118) are interconnected by wire(s) (128) while avoiding overlapping with a second wire and/or a second VIA of a second net. The wire (128) is a representation of a conductive trace within a single layer of the hardware PCB assembly. Accordingly, the net (118) describes the connectivity of the pins (120) associated with the net.

As shown, memory (106) is embedded with one or more system tools, such as design module (110), to support the generation of a boundary and design of the hardware PCB assembly. The design module (110) includes a designer (112) and a boundary module (114). Design module, including designer (112) and boundary module (114), is in communication with PCB data (116). The communication enables designer (112) to create and/or modify PCB data (116) including create and/or modify, VIA (132), wire (128), digital object (126), voltage shape (138), net (118), pin (120), net parameter (122), and layer (130). The designer (112) may interconnect pins (120) associated with net (118) by creating and/or modifying one or more voltage shape(s) (138), wire(s) (128), and/or VIA (132). Similarly, the communication enables boundary module (114) to create a boundary (136) within PCB data (116). The designer (112) utilizes the boundary (136) when creating, modifying, positioning, and/or verifying wire (128) and/or VIA (132). The VIA (132) is a representation of an electrical connection between multiple layers in the hardware PCB assembly. In one embodiment, the VIA (132) may connect to the digital object (126), wire (128), voltage shape (138), and combinations thereof. Accordingly, the design module (110) is provided with functionality to modify and/or create PCB data (116).

The designer (112) utilizes net parameters (122) associated with the net (118) in order to generate and/or modify wire(s) (128) and/or VIA(s) (132) to interconnect pins (120) associated with the respective net (118). The net parameter (122) may be, but is not limited to, wire spacing, importance factor, maximum distance of a wire, minimum distance of a wire, quantity of VIAs in a net and/or utilized by a single wire, and distance from a boundary. Wire spacing may include a distance a wire is spaced from another wire, pin, VIA, boundary, or other element. In one embodiment, the boundary may be an edge of the PCB. The importance factor relates to the criticality of the electrical signal to be carried in the net (118) during operation of the hardware PCB assembly. For example, a high speed signal net will have a high importance factor within net parameter (122) since the signal may be sensitive to electromagnetic compatibility, signal degradation, and/or increased bit error rates. The high importance factor within net parameter (122) designates the net (118) including the one or more wires (128) used to route the net (118) is not permitted to intersect a boundary (136). Similarly, a power net may have a low importance factor within net parameter (122) is a descriptive parameter that the net (118) is less susceptible to signal degradation than a high speed net. The low importance factor designates the net (118) including the one or more wires (128) used to route the net (118) is permitted to intersect and/or approach the boundary (136). The maximum length of the wire is a maximum distance each wire (128) associated with the respective net (118) is permitted to travel. The minimum distance of the wire (128) is a minimum distance each wire (128) associated with the respective net (118) is permitted to travel. The quantity of VIAs provides a maximum and/or minimum quantity of VIAs that an interconnection (e.g., wire(s)) may include when connecting two or more pins (120). Accordingly, the net parameter (122) includes a plurality of factors that enables the designer (112) to dynamically create and/or modify PCB data (116) that can be used to build the hardware PCB assembly with the functionality required to operate.

In order to create boundary (136) within PCB data (116), boundary module (114) identifies at least two voltage shapes (138) (e.g., voltage planes). Each voltage shape (138) is a representation of a conductive element having the same voltage within the confines of the voltage shape within the hardware PCB assembly. Each voltage shape (138) may supply, but is not limited to, a positive voltage, a negative voltage, and a ground. In one embodiment, the voltage shape (138) may be a different level of the positive, and/or negative voltage. In one embodiment, two voltage shapes (138) represent different voltages (e.g., polarities and/or levels of voltage). The boundary module (114) identifies the position of the voltage shape(s) (138) with respect to layer (130). The position determination includes identifying which layer (130) a voltage shape (138) is associated with and where the respective voltage shape (138) is positioned within the respective layer (130). Based on the position of the voltage shape, the boundary module (114) identifies a space (140), if any, between two or more voltage shapes (138) associated with the same layer (130). The space (140) has a geometric shape and is hereinafter referred to as a voltage split. In one embodiment, the voltage split (140) is a region defined by a geometric shape on the layer (130) of the PCB that is positioned between two or more voltage shapes (138) wherein at least two of the voltage shapes (138) have a different voltage. The geometric shape of the voltage split (140) is defined by the geometric shapes of the two or more voltage shapes (138) and the voltage split (140) positioned between the voltage shapes (138). Accordingly, boundary module (114) identifies voltage split (140) based on positioning of voltage shapes (138).

The boundary module (114), in accordance with rule (124), creates a boundary (136) in one or more layers (130). Rule (124) defines how to create the boundary (136) including the size and position of boundary (136). In one embodiment, the size and position of boundary (136) corresponds to the size and position of voltage split (140). For example, the difference and/or similarity in size of the geometric shape of the boundary (136) and the geometric shape of the voltage split (140) is defined by rule (124). The difference and/or similarity may be, but is not limited to, the same size, a predetermined quantity of size larger than the geometric shape of the voltage split, and a predetermined quantity of size smaller than the geometric shape of the voltage split. It is understood that the layers (130) of the PCB data (116) are positioned proximal and in communication with one another. The rule (124) may define in which layers (130) of PCB data (116) to place the boundary (136), including, but not limited to, a quantity of adjacent layers, all adjacent layers, and layers within a predetermined distance from the voltage split (140).

The boundary module (114), in accordance with rule (124), places and positions boundary (136) in one or more layers (130). In one embodiment, the boundary is positioned in adjacent layer(s) to the layer containing the voltage split (140). In one embodiment, rule (124) may define that the centroid of the boundary (136) and the centroid of the voltage split (140) must have two similar coordinates in a three-dimensional system. In one embodiment, the centroid of boundary (136) and the centroid of the voltage split (140) differ by a change in one coordinate corresponding to a difference in layer. In one embodiment, rule (124) defines how to create a break in a wire that has an unresolvable route exception, including the size and position of the break. In one embodiment, rule (124) defines which importance factor value(s) are permitted to intersect and/or approach boundary (136) and/or which importance factor value(s) are not permitted to intersect and/or approach boundary (136). Accordingly, boundary (136) is created based on the geometric shape and position of voltage split (140).

During creation and modification of PCB data (116), the designer (112) determines if a created and/or modified the wire (128) intersects boundary (136). An intersection is when two elements occupy the same coordinates (e.g., two-dimensional or three dimensional) and in one embodiment, within the same layer of the PCB model (142). If the wire (128) does not intersect boundary (136), the wire (128) is determined to be successfully routed. However, if the wire (128) does intersect boundary (136), a route exception is indicated. In one embodiment, the designer (112) indicates the route exception. The designer (112) may suppressed the route exception based on the importance factor in net parameter (122) associated with net (118). For example, a low importance factor within net parameter (122) would indicate that the route is permitted to intersect and/or approach boundary (136) and the route exception would be suppressed and the wire (128) would be determined to be successfully routed. However, a high importance factor within net parameter (122) would indicate that the proposed route is not permitted to intersect and/or approach boundary (136) and the designer (112) would dynamically resolve the route exception. In one embodiment, the designer (112) utilizes rule (124) to determine if the importance factor within net parameter (122) permits the wire (128) to intersect and/or approach boundary (136). Accordingly, the wire (128) may or may not intersect and/or approach boundary (136) depending on the net parameter (122).

Responsive to the route exception, the designer (112) dynamically adjusts the PCB data (116) in real-time to resolve the route exception. The adjustment may be, but is not limited to, determining an alternative route for the wire (128), creating one or more VIAs (132) to a different layer (130), and changing the geometric shape of one or more voltage shapes (138) associated with voltage split (140). An alternative route includes re-routing the wire (128) causing the intersection that avoids intersection with boundary (136). In one embodiment, rule (124) is employed for the wire re-routing. Creating one or more VIAs (132) to a different layer of the PCB model (142) enables the designer (112) to continue routing of wires (128) on a different layer (130) of PCB data (116) without the boundary (136). In one embodiment, the VIA (132) is used to return to the layer (130) with the boundary (136) after creating a route segment of wire(s) (128) on the different layer that avoids the boundary (136). Changing the geometric shape of the voltage shape (138) affects the geometric shape of the voltage split (140) which dynamically affects the geometric shape of the boundary (136) based on rule (124) in real-time. The changed geometric shape of the boundary (136) may enable the route of wire (128) to avoid boundary (136). Accordingly, the route exception is dynamically resolved in real-time to limit signal degradation of the hardware PCB assembly created from PCB data (116).

Figure 2:
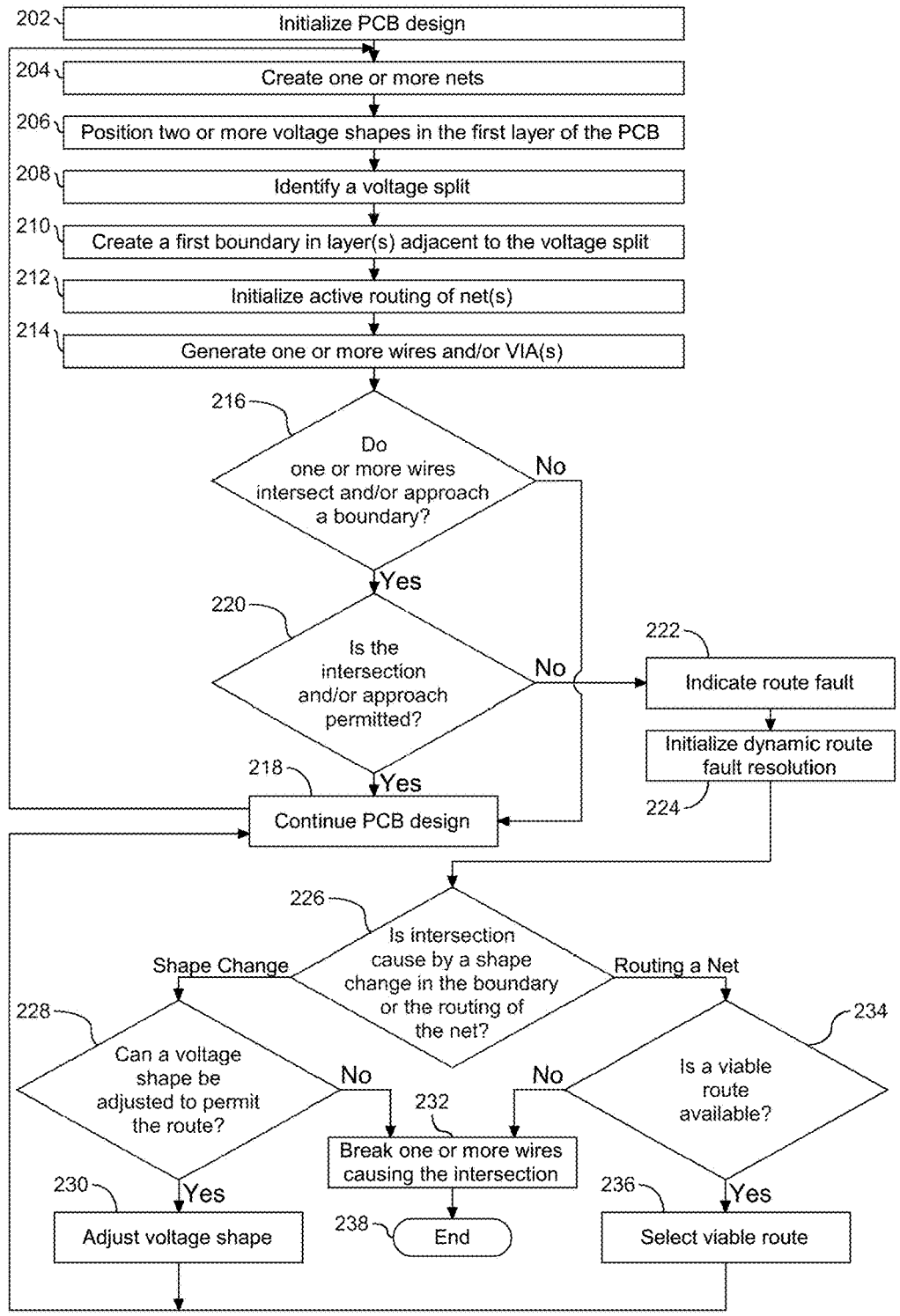
FIG. 2 depicts a flow chart illustrating a method for dynamic electronic PCB design.

Referring to FIG. 2, a flow chart (200) is provided illustrating a method for dynamic electronic printed circuit board (PCB) design. As shown, the PCB design process is initialized (202). The initialization includes creating one or more nets in a PCB model based on the desired functionality of and/or component(s) to be supported by a hardware PCB assembly (204). Each net has at least two pins corresponding to components assigned to the net and each net includes data defining the connectivity of the pins including a net parameter. The net parameter may be, but is not limited to, wire spacing, importance factor, maximum distance of a wire, a minimum distance of a wire, a quantity of VIAs in the net and/or utilized by a single wire, and a distance from a boundary. Accordingly, the net and the net parameter are created to define the desired connectivity of the pins.

As shown, two or more voltage shapes are positioned in a first layer of the PCB model (206). Each voltage shape may support, but is not limited to, a positive voltage, a negative voltage, a ground, and levels thereof. Each voltage shape has a geometric shape in a designated layer of the PCB. After creation of the voltage shapes at step (206), a voltage split is identified in the designated layer of the PCB (208). A voltage split is a space (e.g., geometric shape) between at least two different voltage shapes. For example, a first voltage shape having a first voltage and first geometric shape and a second voltage shape having a second voltage and second geometric shape are placed in the designated layer. The space (e.g., third geometric shape) positioned between and defined by the first and second geometric shapes is the voltage split. Accordingly, the voltage shapes are positioned and the voltage split between the voltage shapes is identified.

A boundary (e.g., keep-out) is created in one or more PCB layers positioned adjacent to the designated layer based on the identified voltage split and a first rule (210). The boundary has a fourth geometric shape corresponding to the third geometric shape of the voltage split based on the first rule. The boundary limits routing of the net(s) including creation of one or more wires in a region of the PCB model which is positioned adjacent to the voltage split. In one embodiment, the third and fourth geometric shapes are the same. Similarly, in one embodiment, the third and fourth geometric shapes are different. In one embodiment, the fourth geometric shape is larger than the third geometric shape based on the first rule. In one embodiment, the fourth geometric shape is smaller than the third geometric shape based on the first rule. In one embodiment, the boundary created at step (210) is dynamically adjusted responsive to creation and/or modification of the voltage shape. Accordingly, the boundary is created in a PCB layer positioned adjacent to the voltage split.

An active routing of the one or more net(s) is initialized (212), and the initialized net(s) is routed (214). The routing includes creating and/or modifying one or more wires and/or VIAs to connect the at least two pins of the net (214). After routing, and in one embodiment during the routing, of the selected net, a determination is made if the one or more wires intersect and/or approach the boundary (216). In one embodiment, the determination at step (216) is performed concurrently with routing of the net at step (214) and the determination at step (216) includes determining whether the one or more wires actively being routed may approach a boundary (e.g., a wire contacting a boundary or within a predetermined distance of a boundary). If the determination is positive at step (216), the process proceeds to step (220). However, if the determination is negative at step (216), the wires were successfully routed and the PCB design continues (218). In one embodiment, following step (218) the process returns to step (204) to continue the PCB design process. Similarly, in one embodiment, step (218) includes rendering the PCB model for display on an associated visual display. In one embodiment, step (218) includes an automatic export of the PCB model in a design file format (e.g., PCB design file) which can be utilized by a hardware PCB assembly manufacturing device. In one embodiment, step (216) is a background process continuously operating in real-time and is reactive to dynamic adjustments in routing and/or voltage shape changes. Accordingly, during and/or after routing of the net, a real-time determination is made of whether the wire(s) intersects the boundary.

As shown, at step (220) it is determined if the potential and/or actual intersection and/or approach of the one or more wires with the boundary is permitted. The determination at step (220) may include analyzing an importance factor associated with the net and comparing the importance factor to a second rule. For instance, if the associated factor is a high importance factor for the net (e.g., high speed signal net), the second rule may define the net is not permitted to intersect and/or approach the boundary. However, if the associated factor is a low importance factor for the net (e.g., power net), the second rule may define the net is permitted to intersect and/or approach the boundary. If the determination is positive at step (220) and the net is permitted to intersect and/or approach the boundary, the PCB design process continues. In one embodiment, a positive determination at step (220) includes a suppression of a route exception. However, if the determination at step (220) is negative and the net is not permitted to intersect and/or approach the boundary, a route exception is indicated (222). Accordingly, a net may or may not be permitted to intersect and/or approach the boundary at step (220) based on the importance factor and a comparison to the second rule.

As shown, following step (222) dynamic route exception resolution is initialized (224). The initialization includes determining if the route exception was caused by a change in the boundary or the routing of the net (226). For example, the net may have been routed prior to a voltage shape and the geometric shape of the voltage shape may have been changed and/or created causing a change in and/or creation of the geometric shape of the boundary and thereby the intersection. Contrastingly, if the boundary was unchanged and the one or more wires of the net are being routed for the first time and/or re-routed due to a parameter change in the net, the routing of the one or more wires in the net are causing the intersection. If the determination at step (226) identifies that the route exception is based on the shape change, the process proceeds to step (228). However, if the determination at step (226) identifies that the route exception is based on routing of the net, the process proceeds to step (234). Accordingly, the dynamic resolution proceeds differently depending on the element causing the intersection of the one or more wires of the net with the boundary.

As shown, at step (228) it is determined if a voltage shape associated with the voltage split associated with the boundary intersected by the route can be adjusted to accommodate the route. For example, the geometric shape of the voltage shape may be adjusted such that the boundary created from the voltage split associated with the voltage shape does not intersect the net. If the determination is positive at step (228), the voltage shape is adjusted (230) and the PCB design process continues at step (218). In one embodiment, the shape adjustment at step (218) includes a change in the PCB design file. However, if the determination at step (228) is negative and the voltage shape cannot be adjusted to accommodate the route, the one or more wires causing the intersection are broken at a location proximal to the intersection (232) and the process concludes (238). The broken wire contains a break which is a discontinuity in the wire. The size and/or position of the break correspond to the boundary and a third rule. In one embodiment, the break at step (232) is overridden (e.g., suppressed, revoked, etc.), the wire is re-connected, and the PCB design process continues at step (218). In one embodiment, the break at step (232) includes a change in the PCB design file. Accordingly, following the determination that the voltage shape is the cause of the intersection, the voltage shape is adjusted to accommodate routing of the one or more wires or the one or more wires intersecting the boundary are broken.

However, if the determination at step (226) is that the intersection is caused by routing of the net, a determination is made if there is a viable route available (234). The determination at step (234) may include determining a viable route that avoids the boundary and conforms to the net parameter. The viable route may include creating a vertical interconnect access (VIA) to a different layer of the PCB and in one embodiment, routing at least one wires in the second layer in order to bypass the first boundary. The second layer may be any layer of the PCB. In one embodiment, a second VIA is created in order to return to the designated layer in which the boundary was first intersected by the routing to complete the routing. If the determination is positive at step (234), the viable route is selected as the route for the one or more wires of the net and the one or more wires of the net are routed utilizing the selected viable route (236). Following step (236), the routing of the PCB design is continued at step (218). In one embodiment, the selection and routing at step (236) includes a change in the PCB design file. However, if the determination at step (234) is negative and a viable route is not available, the one or more wires causing the intersection are broken at a location proximal the intersection (232) and the process concludes (238). In one embodiment, the break at step (232) is overridden including a re-connection of the wire and the PCB design process continues at step (218). Accordingly, following the determination that the routing of the net caused the intersection, a viable route is found or the one or more wires intersecting the boundary are broken.

Figure 3:
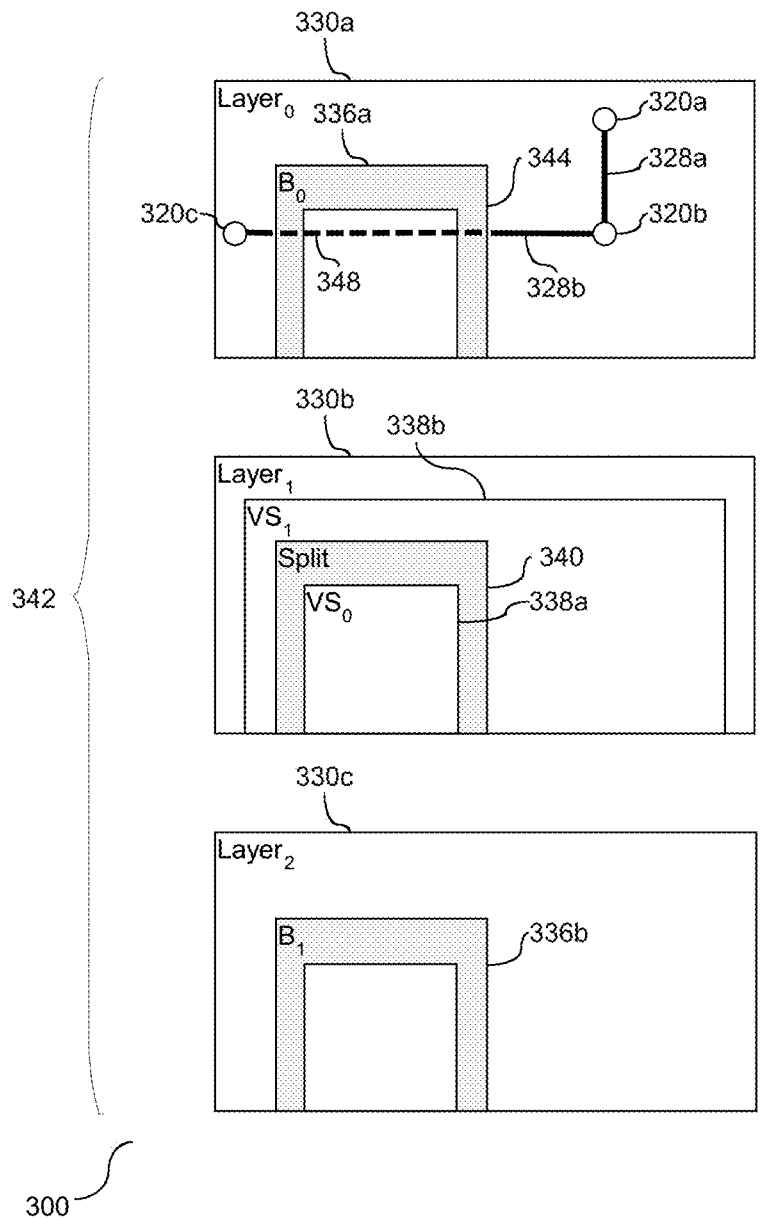
FIG. 3 depicts a block diagram illustrating a representation of an exploded view of a hardware PCB assembly with a route exception.

The creation of the boundary limits a net, including wire(s) associated with the net, from crossing the voltage split thereby increasing efficiency in the design of a hardware PCB assembly. FIG. 1 illustrated a computer system for boundary creation and FIG. 2 illustrated a method for boundary creation. Referring to FIG. 3, a block diagram (300) is provided illustrating a representation of an exploded view of a hardware PCB assembly with a route exception. As shown, a PCB model (342) is shown as having at least three layers, including $layer_0$ (330), $layer_1$ (330b), and $layer_2$ (330c). $Layer_0$ (330) is positioned adjacent to $layer_1$ (330b), and $layer_2$ (330c) is positioned adjacent $layer_1$ (330b). In one embodiment, $layer_1$ (330b) is stacked on top of $layer_2$ (330c) and $layer_0$ (330a) is stacked on top of $layer_1$ (330b). The PCB model (342) includes a first net provided with pins, (320a), (320b), and (320c), which are positioned within layer$_0$ (330a). Voltage shapes, VS$_0$ (338a) and VS$_1$ (338b), are created in layer$_1$ (330b). In one embodiment, each voltage shape VS$_0$ (338a) and VS$_1$ (338b) has a different voltage. The quantity of layers, pins, nets, and voltage shapes is for illustration purposes only and should not be considered limiting.

A space (340) is shown having a geometric shape and positioned between the two voltage shapes, VS$_0$ (338a) and VS$_1$ (338b). The space (340) is referred to herein as a voltage split. The voltage split (340) is defined by the geometric boundaries of voltage shapes, VS$_0$ (338a) and VS$_1$(338b). Based on the voltage split (340), boundaries, B$_0$ (336a) and B$_1$ (336b), are created in layer$_0$ (330a) and layer$_2$ (330c). The first net is routed in accordance with a rule including generation of wire (328a) which is routed between pin (320a) and pin (320b) and wire (328b) which runs from pin (320b) towards pin (320c). However, wire (328b) is determined to be approaching boundary, B$_0$ (340) at intersection (344). The creation of wire (328b) ceases before wire (328b) crosses the voltage split (340). A route exception is indicated based on the determined approach of wire (328b). In one embodiment, wire (328b) includes portion (348) which intersects boundary, B$_0$ (336a) at intersection (344) and a route exception is indicated. The boundaries, B$_0$ (336a) and B$_1$ (336b) may be used as a preventative measure or a reactive measure. For example, the preventative measure limits a wire from intersecting and/or crossing through a boundary during routing of a net. The preventative measure resolves route exceptions in real-time. The reactive measure may permit a wire to intersect and/or cross through a boundary and indicate a route exception to be handled at a subsequent time. Accordingly, a first net is routed in layer$_0$ (330a) including wire (328b) which intersects boundary (336a) corresponding to voltage split (340) in layer$_1$ (330b).

Figure 4:
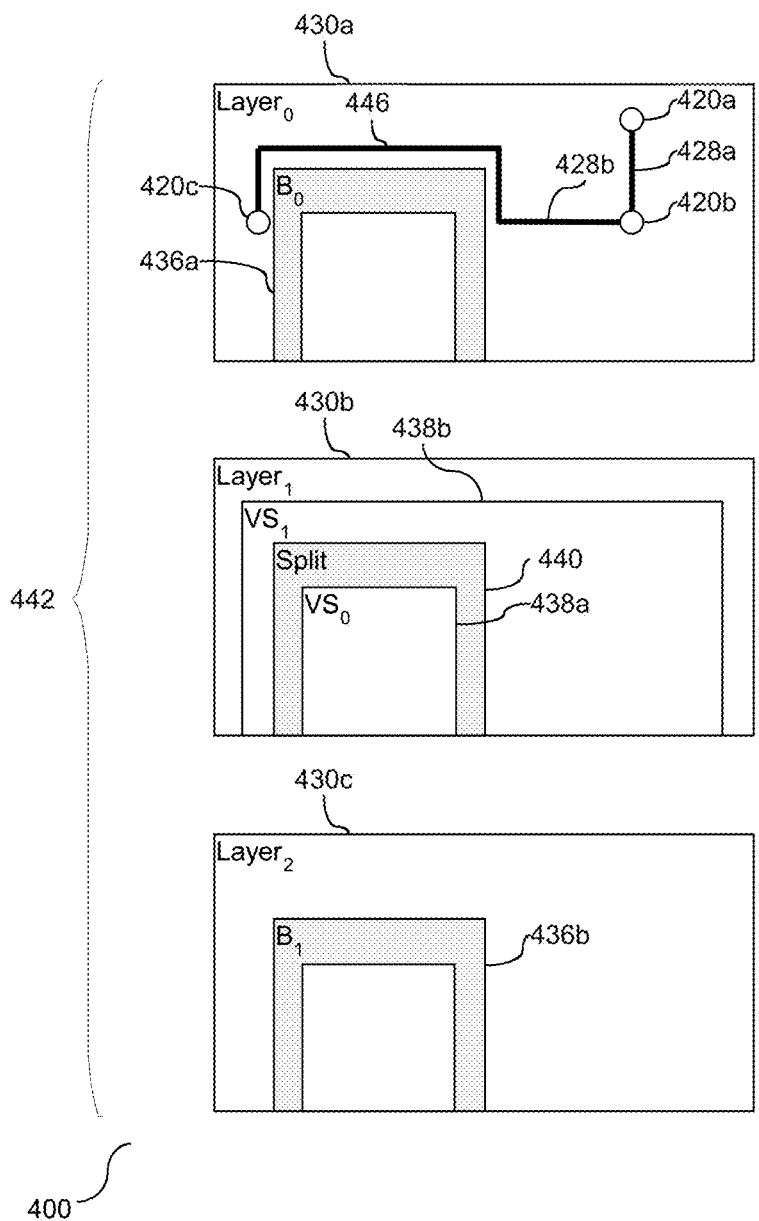
FIG. 4 depicts a block diagram illustrating an embodiment of a representation of an exploded view of the hardware PCB assembly with a route exception resolved by a wire route change.

Responsive to the intersection and/or approach identification in FIG. 3, the route exception is dynamically resolved. In one embodiment, wire (328b) is created after voltage shapes (338a) and (338b) and the intersection (344) is caused by the creation of wire (328b). Referring to FIG. 4, a block diagram (400) is provided illustrating an embodiment of a representation of an exploded view of the hardware PCB assembly with a route exception resolved by a wire route change. As shown, voltage shapes, VS$_0$ (438a) and VS$_1$ (438b), boundaries, B$_0$ (436a) and B$_1$ (436b), wire (428a), pins (420a), (420b), and (420c), and voltage split (440) remain unchanged from PCB model (342) in FIG. 3. However, wire (428b) has been adjusted from wire (328b). In one embodiment, the adjustment of the wire (428b) is dynamic and in real-time. Wire (428b) is shown routed with portion (446) of wire (428b) that avoids the boundary, B$_0$ (436a). The route of wire (428b) is a viable route that avoids B$_0$ (436a) and interconnects pins (420b) and (420c) as required by the first net. Accordingly, the route exception is shown herein having been dynamically resolved by finding the viable route for wire (428b) which avoids intersection with boundary, B$_0$ (436a).

Figure 5:
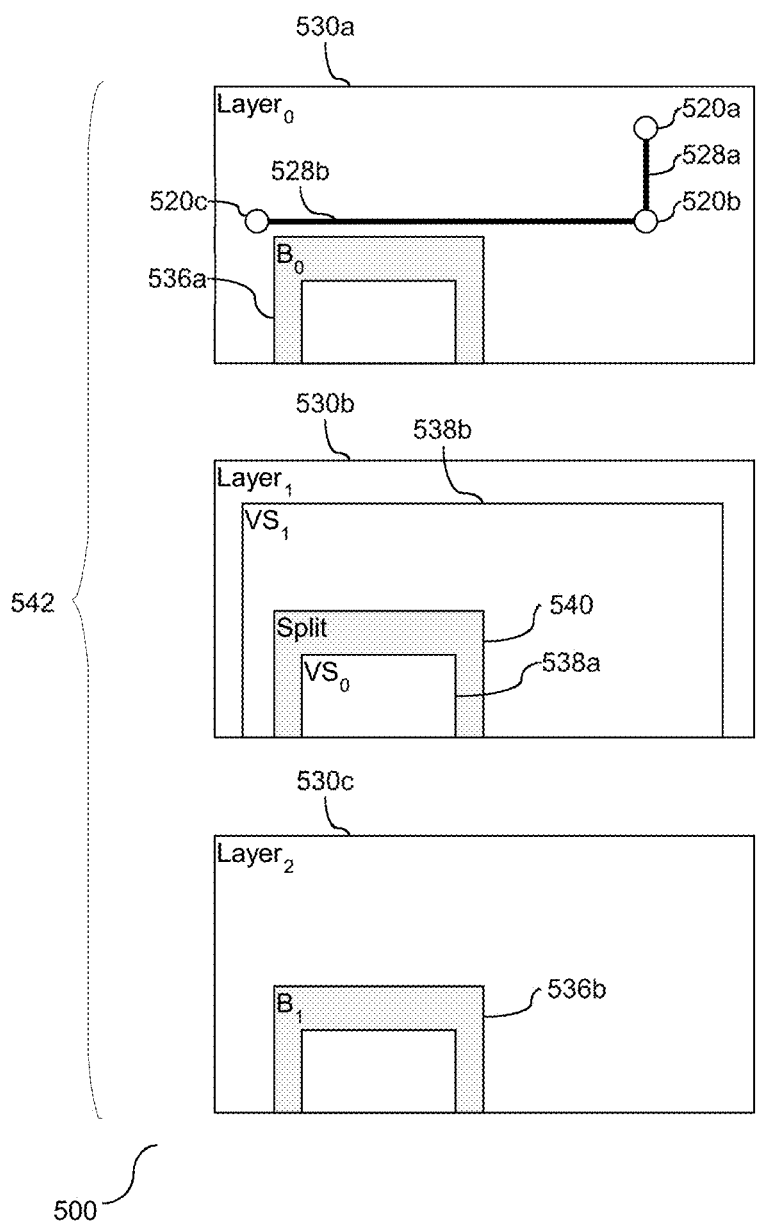
FIG. 5 depicts a block diagram illustrating an embodiment of a representation of an exploded view of the hardware PCB assembly with a route exception resolved by a voltage shape change.

If the voltage shape VS$_0$ (338a) in FIG. 3 was created after the wire (328b), the voltage shapes, VS$_0$ (338a) and/or VS$_1$ (338b) may be adjusted to enable wire (328b) to connect pins (320b) and (320c) without intersecting boundary (336a). In one embodiment, the voltage shape adjustment is dynamic and in real-time. Referring to FIG. 5, a block diagram (500) is provided illustrating an embodiment of a representation of an exploded view of the hardware PCB assembly with a route exception resolved by a voltage shape change. As shown, voltage shape, VS$_1$ (538b), boundaries, B$_0$ (536a) and B$_1$ (536b), pins (520a), (520b), and (520c), and wires, (528a) and (528b), remain unchanged from PCB model (332) in FIG. 3. However, voltage shape, VS$_0$ (538a) has been dynamically adjusted. In one embodiment, the adjustment of the voltage shape is dynamic and in real-time. The adjustment included a geometric shape change which affects the geometric shape of voltage split (540) which causes boundaries, B$_0$ (536a) and B$_1$ (536b), to be adjusted based on the rule. In one embodiment, the boundary adjustment is dynamic and in real-time. The adjusted boundary B$_0$ (536a) does not intersect wire (528b). Accordingly, the route exception is shown herein having been resolved by changing the geometric shape of voltage shape (538a) which creates boundary (536a) which does not intersect wire (528b).

Figure 6:
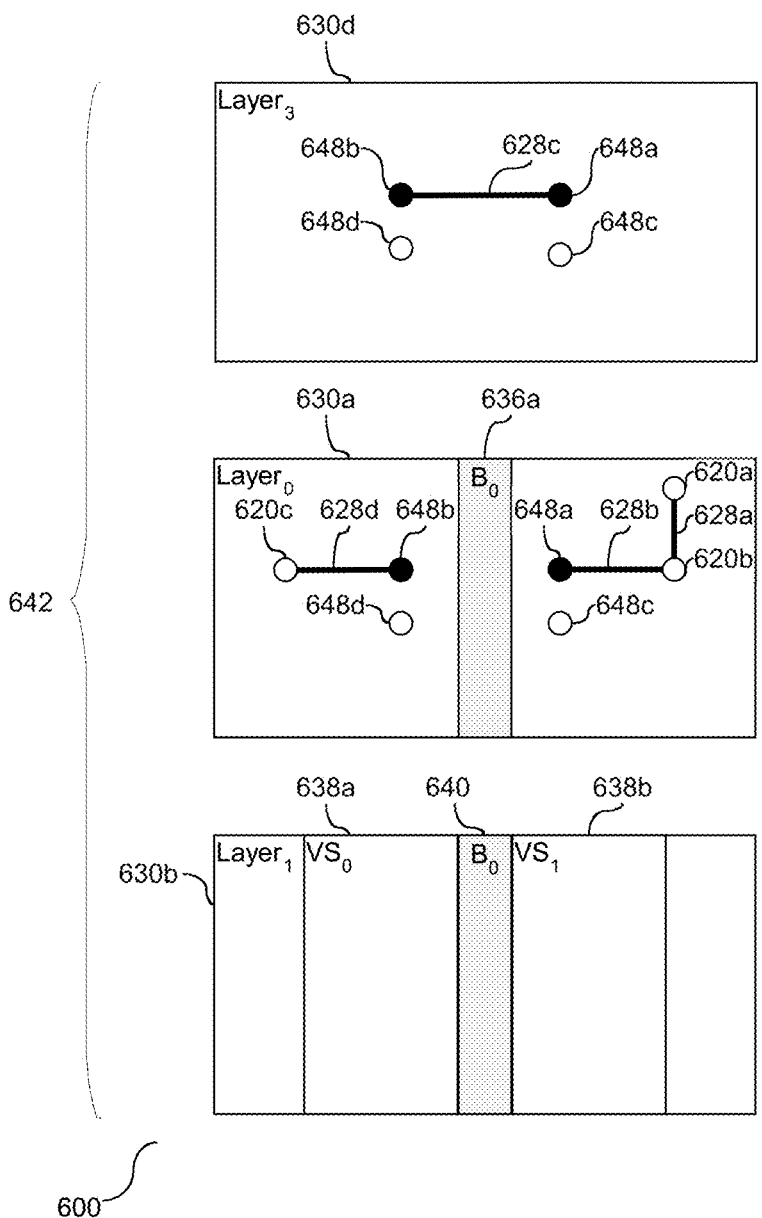
FIG. 6 depicts a block diagram illustrating an embodiment of a representation of an exploded view of the hardware PCB assembly with a route exception resolved by a VIA.

A wire may not be able to be re-routed within the same layer and/or a voltage shape may not be able to be changed. Referring to FIG. 6, a block diagram (600) is provided illustrating an embodiment of a representation of an exploded view of the hardware PCB assembly with a route exception resolved by a VIA. As shown, a PCB model (642) contains layers, layer$_0$ (630a), layer$_1$ (630b), and layer$_3$ (630d). Layer$_0$ (630) is positioned adjacent to layer$_1$ (630b) and layer$_3$ (630d) is positioned adjacent layer$_0$ (330a). The PCB model (642) includes a first net provided with pins, (620a), (620b), and (620c), which are positioned within layer$_0$ (630a). Voltage shapes, VS$_0$ (638a) and VS$_1$ (638b), are positioned in layer$_1$ (630b) and each voltage shape, VS$_0$ (638a) and VS$_1$ (638b), has a geometric shape which cannot be changed due to a parameter associated with the respective voltage shape, VS$_0$ (638a) and VS$_1$ (638b). In one embodiment, each voltage shape VS$_0$ (638a) and VS$_1$ (638b) has a different voltage. The quantity of layers, pins, nets, and voltage shapes is for illustration purposes only and should not be considered limiting.

Voltage split (640), having a geometric shape, is positioned between the two voltage shapes, VS$_0$ (638a) and VS$_1$ (638b). Based on the voltage split (640), boundary, B$_0$ (636a) is created in layer$_0$ (630a). The first net is routed including generation of wire (628a) which is routed between pin (620a) and pin (620b). A direct routing of wire (328b) between pin (620b) and pin (620c) solely within layer$_0$ (630a) intersects and/or approaches boundary, B$_0$ (636a), and a route exception is indicated. Responsive to the route exception, the route of wire (628b) is resolved to avoid boundary, B$_0$ (636a). In one embodiment, the wire route is dynamically resolved. The resolution includes creation of VIA (648a) in order to route wire (628c) on layer$_3$ (630d) since layer$_3$ (630d) has available space for routing a wire. In one embodiment, layer$_3$ (630d) does not have boundary (636a) and wire (628c) bypasses boundary, B$_0$ (636a). In one embodiment, layer$_3$ (630d) has a boundary (not shown) but the boundary can be avoided and/or changed wherein wire (628c) can bypass boundary, B$_0$ (636a) in layer$_3$ (630d). Wire (628c) is routed and a second VIA (648b) is created to return to layer$_0$ (630a) and routing of the net is finished by creating wire (628b) to complete the interconnection of pins (620b) and (620c). In one embodiment, the route exception resolution includes creation of VIAs (648c) and (648d) for return current. In one embodiment, one or more of VIAs (648a)-(648d) are dynamically created as thru-hole VIAs which extend through the cross-section of layer$_3$ (630d), layer$_0$ (630a), and layer$_1$ (630b) (e.g., through the entire PCB model (642)). The proximity and position of layer$_3$ (630d) and the quantity of VIAs and the quantity of layers utilized by the VIAs should be not be considered limiting. For instance, it is understood in the art that a VIA may traverse through multiple layers and travel in multiple directions. Accordingly, the route exception is shown herein having been resolved by utilizing a VIA to create a route on a different PCB layer which has an available alternative route.

Figure 7:
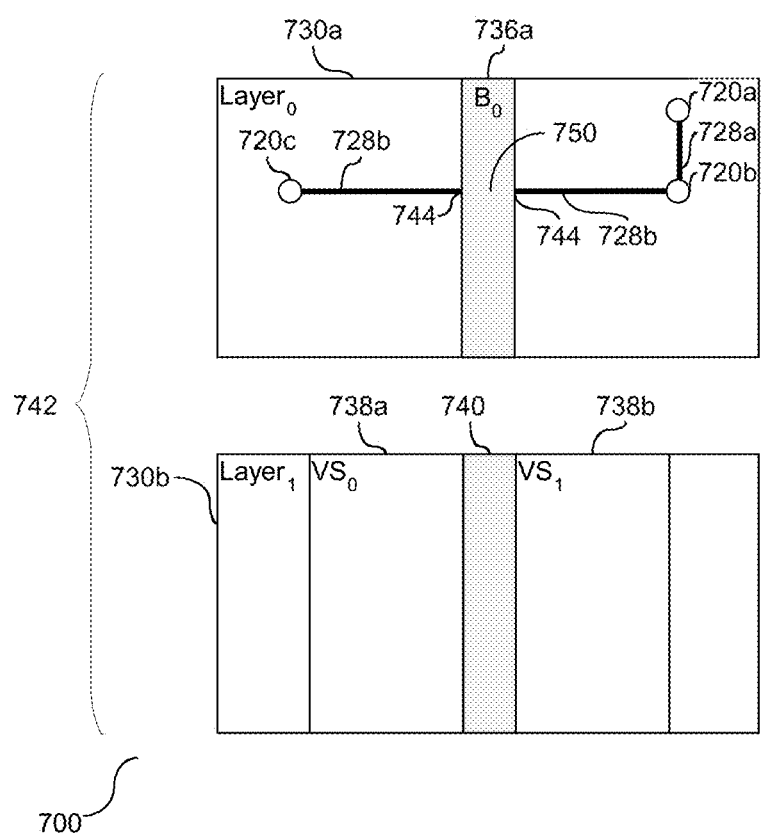
FIG. 7 depicts a block diagram illustrating an embodiment of a representation of an exploded view of the hardware PCB assembly with an unresolvable route exception.

A wire may not be able to be re-routed within a layer of the PCB and/or a voltage shape may not be able to be changed. For example, there may not be a layer available in the PCB for continuing the routing which avoids the voltage split and/or the alternative route violates a rule for routing the wire(s). Referring to FIG. 7, a block diagram (700) is provided illustrating an embodiment of a representation of an exploded view of the hardware PCB assembly with an unresolvable route exception. As shown, PCB model (742) is provided with layers, $layer_0$ (730a) and $layer_1$ (730b). $Layer_0$ (730a) is adjacent to $layer_1$ (730b). Voltage shapes, $VS_0$ (738a) and $VS_1$ (738b), are created and positioned in $layer_1$ (730b). In one embodiment, each voltage shape $VS_0$ (338a) and $VS_1$ (338b) has a different voltage. PCB model (742) includes a first net provided with pins, (720a), (720b), and (720c), which are positioned within $layer_0$ (730a). The quantity of layers, pins, nets, and voltage shapes is for illustration purposes only and should not be considered limiting.

A voltage split (740) having a geometric shape is positioned between the two voltage shapes, $VS_0$ (738a) and $VS_1$ (738b). Based on the voltage split (740), boundary, $B_0$ (736a) is created in $layer_0$ (730a). The first net is routed in accordance with a rule including generation of wire (728a) which is routed between pin (720a) and pin (720b) and wire (728b) which runs between pin (720b) and pin (720c). Wire (728b) intersects (728b) at intersection (744) and a route exception is indicated. A determination is made that voltage shapes, $VS_0$ (738a) and $VS_1$ (738b), are not changeable (e.g., not re-configurable) to accommodate wire (728b) and there is not a viable route for (728b) to complete the interconnection between pin (720b) and (720c) that avoids boundary (736a). Responsive to the determination, a break (750) is created in wire (728b). The break (750) is a discontinuity in the wire (728a). In one embodiment, a notification is generated from the route exception and transmitted to a visual display. Accordingly, the unresolvable route exception breaks the wire intersecting the boundary.

Aspects of dynamic resolution of a route exception shown in FIGS. 1-7, employ one or more functional tools to support use of the generated boundary. Aspects of the functional tool, e.g. design module, and its associated functionality may be embodied in a computer system/server in a single location, or in one embodiment, may be configured in a cloud based system sharing computing resources. With references to FIG. 8, a block diagram (800) is provided illustrating an example of a computer system/server (802), hereinafter referred to as a host (802) in communication with a cloud based support system, to implement the processes described above with respect to FIGS. 1-7. Host (802) is operational with numerous other general purpose or special purpose computing system environments or configurations. Examples of well-known computing systems, environments, and/or configurations that may be suitable for use with host (802) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (802) may be described in the general context of computer system-executable instructions, such as program modules, being executed by a computer system. Generally, program modules may include routines, programs, objects, components, logic, data structures, and so on that perform particular tasks or implement particular abstract data types. Host (802) may be practiced in distributed cloud computing environments where tasks are performed by remote processing devices that are linked through a communications network. In a distributed cloud computing environment, program modules may be located in both local and remote computer system storage media including memory storage devices.

Figure 8:
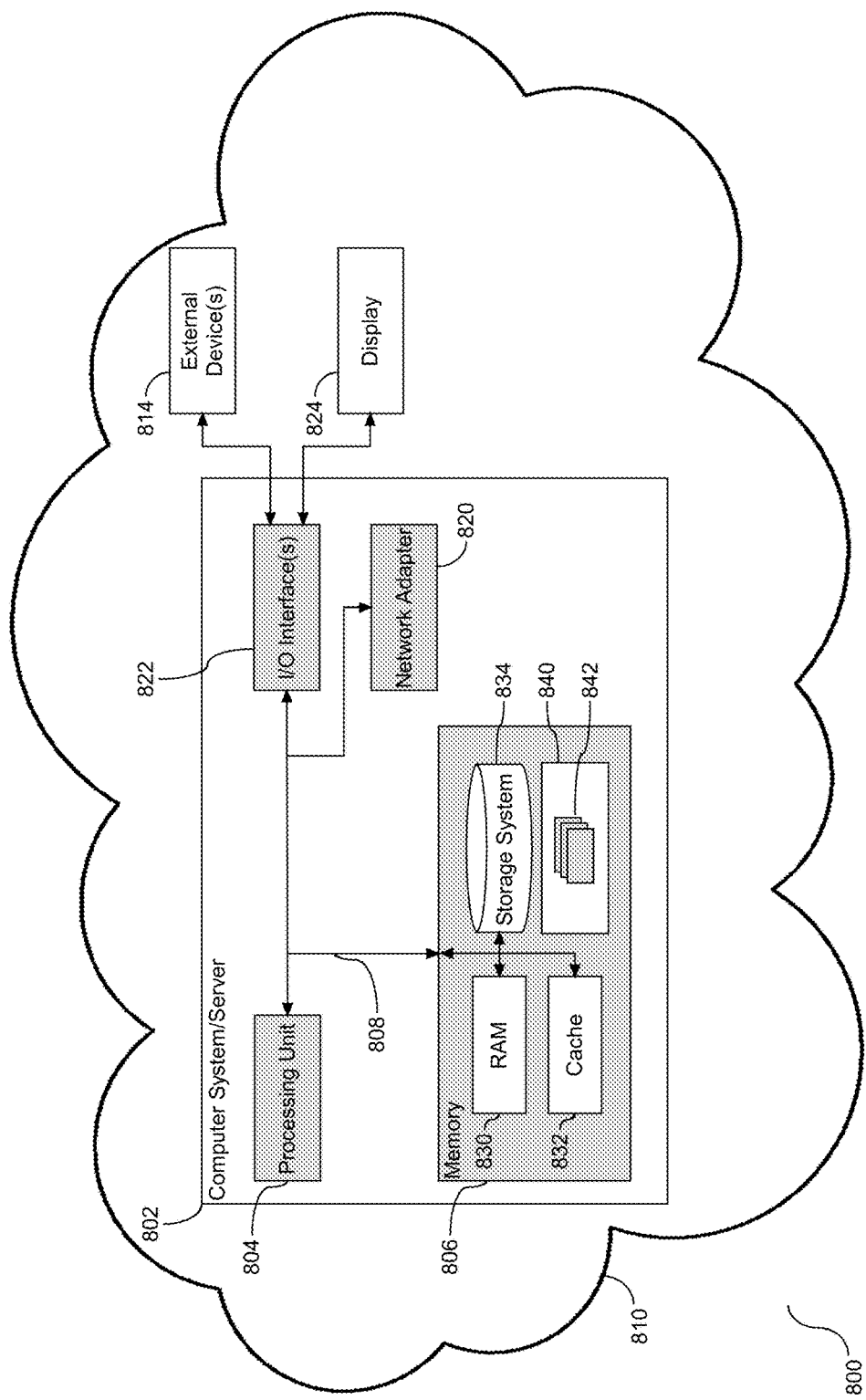
FIG. 8 is a block diagram illustrating an example of a computer system/server of a cloud based support system, to implement the process described above with respect to FIGS. 1-7.

As shown in FIG. 8, host (802) is shown in the form of a general-purpose computing device. The components of host (802) may include, but are not limited to, one or more processors or processing units (804), a system memory (806), and a bus (808) that couples various system components including system memory (806) to processor (804). Bus (808) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (802) typically includes a variety of computer system readable media. Such media may be any available media that is accessible by host (802) and it includes both volatile and non-volatile media, removable and non-removable media.

Memory (806) can include computer system readable media in the form of volatile memory, such as random access memory (RAM) (830) and/or cache memory (832). By way of example only, storage system (834) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (808) by one or more data media interfaces.

Program/utility (840), having a set (at least one) of program modules (842), may be stored in memory (806) by way of example, and not limitation, as well as an operating system, one or more application programs, other program modules, and program data. Each of the operating systems, one or more application programs, other program modules, and program data or some combination thereof, may include an implementation of a networking environment. Program modules (842) generally carry out the functions and/or methodologies of embodiments to store and analyze data. For example, the set of program modules (842) may include the modules configured as a design module in order to dynamically resolve a route exception as described in FIGS. 1-7.

Host (802) may also communicate with one or more external devices (814), such as a keyboard, a pointing device, etc.; a display (824); one or more devices that enable a user to interact with host (802); and/or any devices (e.g., network card, modem, etc.) that enable host (802) to communicate with one or more other computing devices. Such communication can occur via Input/Output (I/O) interface(s) (822). Still yet, host (802) can communicate with one or more networks such as a local area network (LAN), a general wide area network (WAN), and/or a public network (e.g., the Internet) via network adapter (820). As depicted, network adapter (820) communicates with the other components of host (802) via bus (808). In one embodiment, a plurality of nodes of a distributed file system (not shown) is in communication with the host (802) via the I/O interface (822) or via the network adapter (820). It should be understood that although not shown, other hardware and/or software components could be used in conjunction with host (802). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (806), including RAM (830), cache (832), and storage system (834), such as a removable storage drive and a hard disk installed in a hard disk drive.

Computer programs (also called computer control logic) are stored in memory (806). Computer programs may also be received via a communication interface, such as network adapter (820). Such computer programs, when run, enable the computer system to perform the features of the present embodiments as discussed herein. In particular, the computer programs, when run, enable the processing unit (804) to perform the features of the computer system. Accordingly, such computer programs represent controllers of the computer system.

In one embodiment, host (802) is a node (810) of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 9:
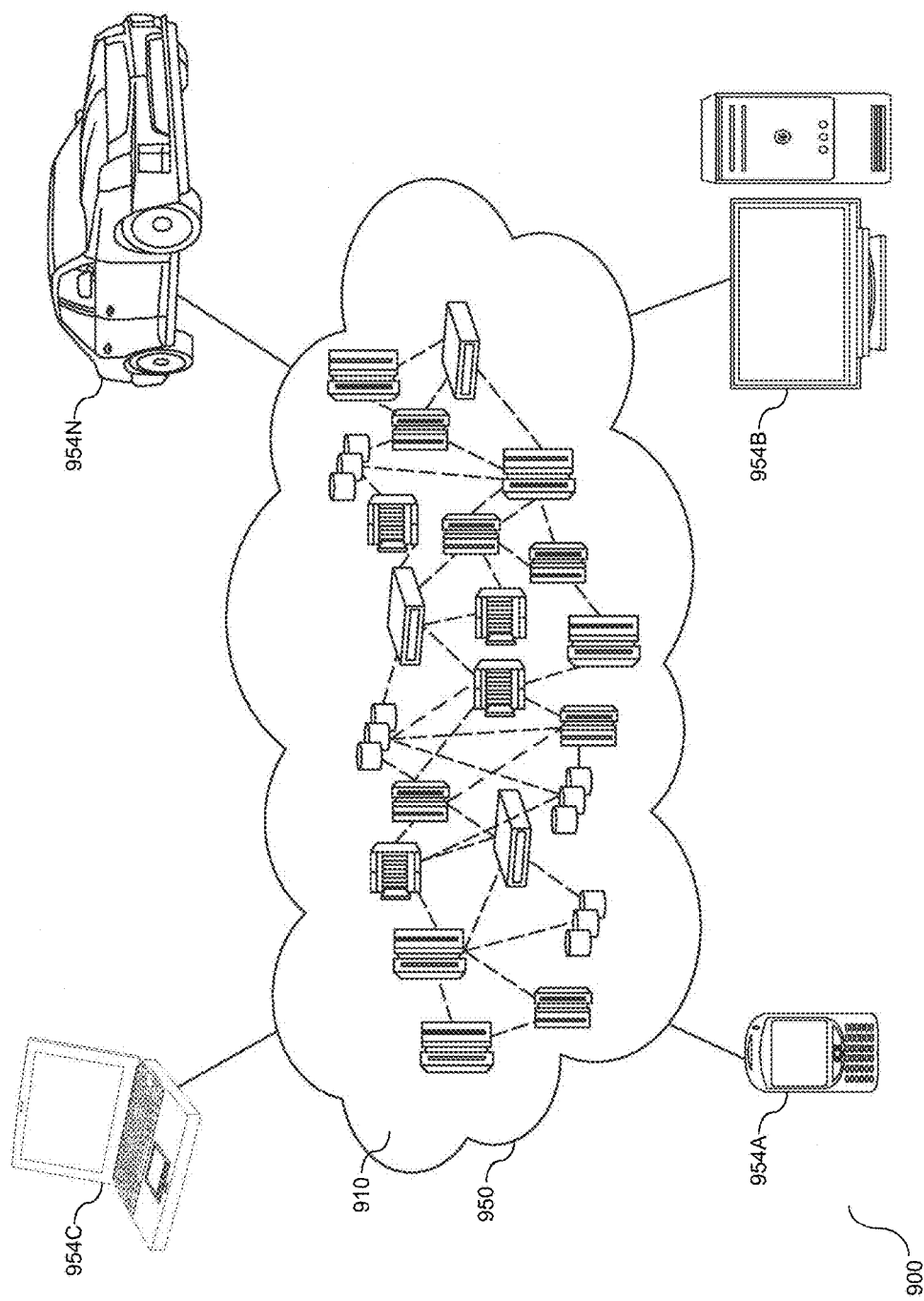
FIG. 9 depicts a block diagram illustrating a cloud computer environment.

Referring now to FIG. 9, an illustrative cloud computing network (900). As shown, cloud computing network (900) includes a cloud computing environment (950) having one or more cloud computing nodes (910) with which local computing devices used by cloud consumers may communicate. Examples of these local computing devices include, but are not limited to, personal digital assistant (PDA) or cellular telephone (954A), desktop computer (954B), laptop computer (954C), and/or automobile computer system (954N). Individual nodes within nodes (910) may further communicate with one another. They may be grouped (not shown) physically or virtually, in one or more networks, such as Private, Community, Public, or Hybrid clouds as described hereinabove, or a combination thereof. This allows cloud computing environment (900) to offer infrastructure, platforms and/or software as services for which a cloud consumer does not need to maintain resources on a local computing device. It is understood that the types of computing devices (954A-N) shown in FIG. 9 are intended to be illustrative only and that the cloud computing environment (950) can communicate with any type of computerized device over any type of network and/or network addressable connection (e.g., using a web browser).

Figure 10:
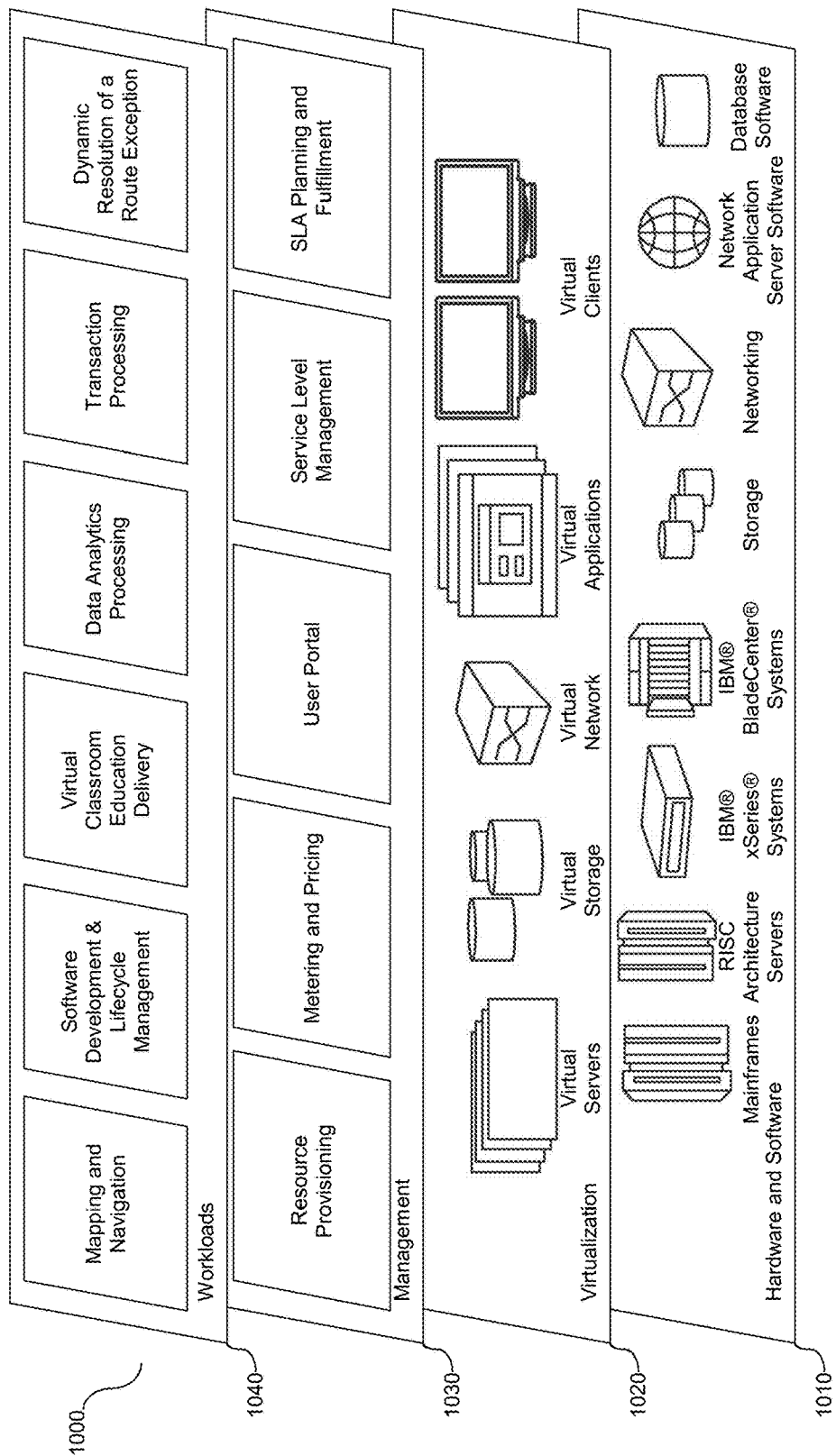
FIG. 10 depicts a block diagram illustrating a set of functional abstraction model layers provided by the cloud computing environment.

Referring now to FIG. 10, a set of functional abstraction layers (1000) provided by the cloud computing network of FIG. 9 is shown. It should be understood in advance that the components, layers, and functions shown in FIG. 10 are intended to be illustrative only, and the embodiments are not limited thereto. As depicted, the following layers and corresponding functions are provided: hardware and software layer (1010), virtualization layer (1020), management layer (1030), and workload layer (1040). The hardware and software layer (1010) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (1020) provides an abstraction layer from which the following examples of virtual entities may be provided: virtual servers; virtual storage; virtual networks, including virtual private networks; virtual applications and operating systems; and virtual clients.

In one example, management layer (1030) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides prearrangement for, and procurement of, cloud computing resources for which a future requirement is anticipated in accordance with an SLA.

Workloads layer (1040) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and dynamic resolution of a route exception.

The present embodiments may be a system, a method, and/or a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A computer readable signal medium includes a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium is any computer readable medium that is not a computer readable storage medium and that can communicate, propagate, or transport a program for use by or in connection with an instruction execution system, apparatus, or device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single dataset, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of the disclosed embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated. Creation of a boundary based on a voltage split optimizing route placement during PCB design thereby limiting electromagnetic incompatibility, signal degradation, and/or increased bit error rates.

It will be appreciated that, although specific embodiments have been described herein for purposes of illustration, various modifications may be made without departing from the spirit and scope of the embodiments. In particular, the quantity of components, boundaries, VIAs, wires, and nets should not be considered limiting. Additionally, the dynamic resolution may utilize a plurality of different PCB layers to complete routing of a net which avoids a boundary. Accordingly, the scope of protection of these embodiments is limited only by the following claims and their equivalents.

What is claimed is:

1. A computer system for dynamic electronic printed circuit board (PCB) design comprising:
   a processor in communication with a memory;
   a design module in communication with the processor and memory, the memory comprising instructions to cause the design module to:
      identify a voltage split having a first geometric shape in a first layer of a PCB;
      dynamically create a first boundary in one or more adjacently positioned layers of the PCB with respect to the first layer, the first boundary having a second geometric shape corresponding to the first geometric shape;
dynamically route a net having at least two pins in the PCB including determine a first route for one or more wires to connect the at least two pins;
identifying a route exception including determine the first route intersects the first boundary in at least one of the adjacently positioned layers; and
dynamically resolve the route exception; and
a PCB model file generated by the design module, and manufacture the PCB from the generated file.

2. The system of claim 1, further comprising the design module to:
determine one or more parameters of the net, the parameters selected from the group consisting of: a wire spacing, importance factor, maximum distance of a wire, a minimum distance of a wire, a quantity of VIAs, and a distance from a boundary, wherein the determination of the first route including the wires, conforms to the net parameters.

3. The system of claim 1, wherein the dynamic resolution further comprises the design module to:
determine a second route for the wires that avoids the first boundary;
select the second route as a viable route for the wires; and
route the net according to the selected viable route.

4. The system of claim 3, wherein the second route determination further comprises the design module to:
create a vertical interconnect access (VIA) to a second layer of the PCB; and
determine a route segment in the second layer that bypasses the first boundary, wherein the second route includes the VIA and the route segment.

5. The system of claim 1, wherein the dynamic resolution further comprises the design module to:
create a break in at least one of the wires based on a location of the intersection.

6. The system of claim 1, wherein the voltage split is a region between two different voltage shapes in the first layer of the PCB.

7. The system of claim 1, wherein the dynamic resolution further comprises the design module to:
change the first geometric shape of the voltage split to a third geometric shape;
create a second boundary in the adjacently positioned layers of the PCB, the second boundary having a fourth geometric shape corresponding to the third geometric shape; and
determine the first route avoids the second boundary;
select the first route as a viable route for the wires; and
route the net according to the selected viable route.

8. A computer program product for dynamic electronic printed circuit board (PCB) design, the computer program product comprising a computer readable storage device having program code embodied therewith, the program code executable by a processor to generate a PCB model file, including:
identify a voltage split having a first geometric shape in a first layer of a PCB;
dynamically create a first boundary in one or more adjacently positioned layers of the PCB with respect to the first layer, the first boundary having a second geometric shape corresponding to the first geometric shape;
dynamically route a net having at least two pins in the PCB including determine a first route for one or more wires to connect the at least two pins;
identify a route exception including determine the first route intersects the first boundary in at least one of the adjacently positioned layers; and
dynamically resolve the route exception; and
utilizing the file to manufacture the PCB.

9. The computer program product of claim 8, further comprising program code to:
determine one or more parameters of the net, the parameters selected from the group consisting of: wire spacing, importance factor, maximum distance of a wire, a minimum distance of a wire, a quantity of VIAs, and a distance from a boundary, wherein the determination of the first route including the wires, conforms to the net parameters.

10. The computer program product of claim 8, wherein the dynamic resolution further comprises program code to:
determine a second route for the wires that avoids the first boundary;
select the second route as a viable route for the wires; and
route the net according to the selected viable route.

11. The computer program product of claim 10, wherein the second route determination further comprises program code to:
create a vertical interconnect access (VIA) to a second layer of the PCB; and
determine a route segment in the second layer that bypasses the first boundary, wherein the second route includes the VIA and the route segment.

12. The computer program product of claim 8, wherein the voltage split is a region between two different voltage shapes in the first layer of the PCB.

13. The computer program product of claim 8, wherein the dynamic resolution further comprises program code to:
change the first geometric shape of the voltage split to a third geometric shape;
create a second boundary in the adjacently positioned layers of the PCB, the second boundary having a fourth geometric shape corresponding to the third geometric shape; and
determine the first route avoids the second boundary;
select the first route as a viable route for the wires; and
route the net according to the selected viable route.

14. A method for dynamic electronic printed circuit board (PCB) design comprising:
generating a PCB model file including:
identifying a voltage split having a first geometric shape in a first layer of a PCB;
dynamically creating a first boundary in one or more adjacently positioned layers of the PCB with respect to the first layer, the first boundary having a second geometric shape corresponding to the first geometric shape;
dynamically routing a net having at least two pins in the PCB including, determining a first route for one or more wires to connect the at least two pins;
identifying a route exception including determining the first route intersects the first boundary in at least one of the adjacently positioned layers; and
dynamically resolving the route exception; and
utilizing the file to manufacture the PCB.

15. The method of claim 14, further comprising:
determining one or more parameters of the net, the parameters selected from the group consisting of: wire spacing, importance factor, maximum distance of a wire, a minimum distance of a wire, a quantity of VIAs, and a distance from a boundary, wherein the determination of the first route including the wires, conforms to the net parameters.

16. The method of claim 14, wherein dynamically resolving the route exception further comprises:
determining a second route for the wires that avoids the first boundary;
selecting the second route as a viable route for the wires; and
routing the net according to the selected viable route.

17. The method of claim 16, wherein determining a second route for the one or more wires that avoids the first boundary further comprises:
creating a vertical interconnect access (VIA) to a second layer of the PCB; and
determining a route segment in the second layer that bypasses the first boundary, wherein the second route includes the VIA and the route segment.

18. The method of claim 14, wherein dynamically resolving the route exception further comprises:
creating a break in at least one of the wires based on a location of the intersection.

19. The method of claim 14, wherein the voltage split is a region between two different voltage shapes in the first layer of the PCB.

20. The method of claim 14, wherein dynamically resolving the route exception further comprises:
changing the first geometric shape of the voltage split to a third geometric shape;
creating a second boundary in the adjacently positioned layers of the PCB, the second boundary having a fourth geometric shape corresponding to the third geometric shape; and
determining the first route avoids the second boundary;
selecting the first route as a viable route for the wires; and
routing the net according to the selected viable route.

* * * * *